United States Patent [19]

Gosnell

[11] 4,248,276
[45] Feb. 3, 1981

[54] ICE DISPENSER WITH ANTI-JAMMING MEANS

[75] Inventor: Michael P. Gosnell, Easton, Pa.

[73] Assignee: Follett Corporation, Easton, Pa.

[21] Appl. No.: 41,584

[22] Filed: May 23, 1979

[51] Int. Cl.³ .................... B65B 1/06; B65B 1/30
[52] U.S. Cl. ............................... 141/87; 141/192;
141/362; 222/149; 222/533; 366/184; 414/323
[58] Field of Search ............. 62/344; 141/1, 82, 86,
141/87, 88, 89, 90, 115, 192, 351, 360–362, 392;
222/149, 200, 533, 558; 366/184; 414/323, 326

[56] References Cited

U.S. PATENT DOCUMENTS

| 2,731,187 | 1/1956 | Marquis | 141/361 |
| 4,102,660 | 7/1978 | Beckett et al. | 62/344 |

Primary Examiner—Frederick R. Schmidt
Attorney, Agent, or Firm—Seidel, Gonda, Goldhammer & Panitch

[57] ABSTRACT

The spout of an ice dispenser has an anti-jamming rod. The auger motor causes the rod to move in the spout. A means is provided to stop the motor in response to interference with such movement of the rod.

11 Claims, 6 Drawing Figures

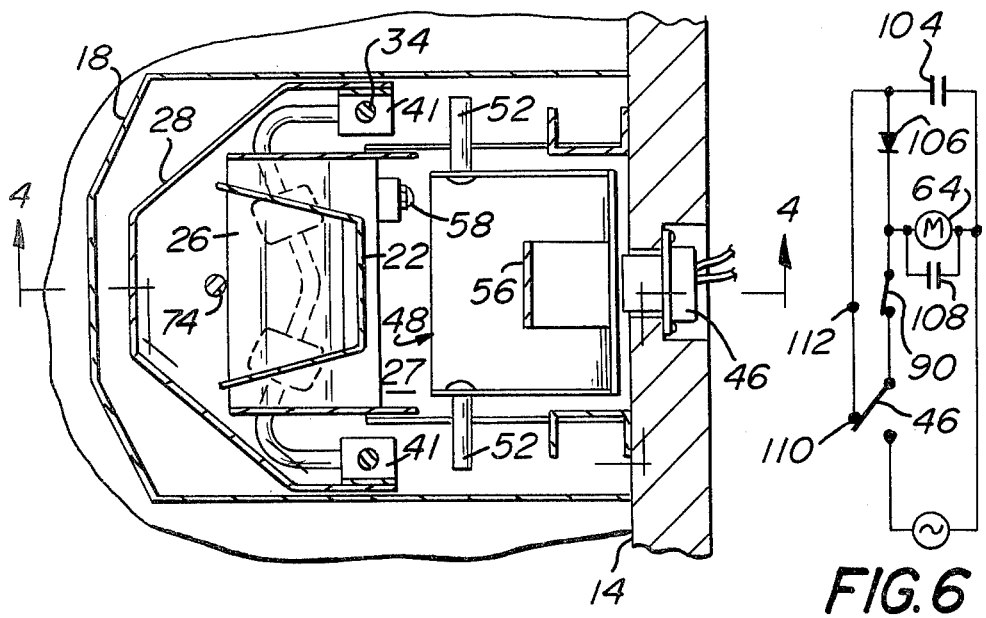
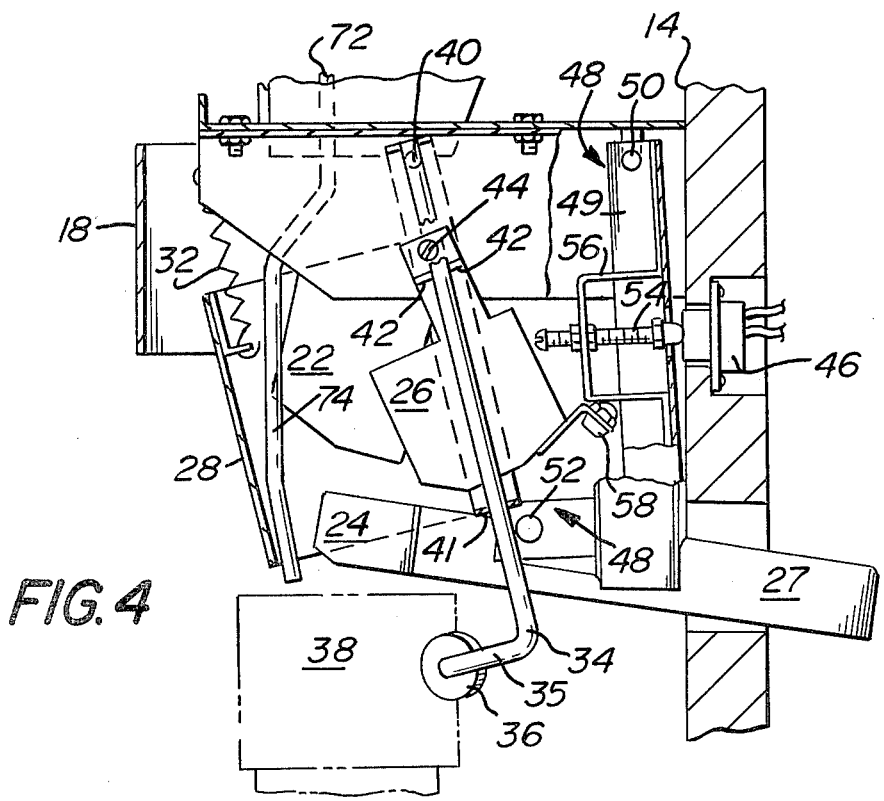

ICE DISPENSER WITH ANTI-JAMMING MEANS

BACKGROUND

Automatic ice dispensers are designed to fill drinking containers with ice. There are three typical problems associated with such dispensers. The first problem is jamming. Once jamming of ice in a dispensing spout occurs, the problem becomes materially aggrevated because the auger or other feed device continues to introduce more ice into the spout. The second problem is related to spillage which occurs when part of the dispensed ice misses the container. Such ice builds up under the container filling device where it becomes unusable and unsightly. The third problem is related to the "in-flight" ice that is still falling through the spout when the container is removed and the dispensing motor deactivated. Such ice also ends up as spillage.

One solution to the third problem is the provision of a device which will interrupt and catch the "in-flight" ice when the container is removed. One solution to the second problem lies in installing deflectors in the flow path in the spout so as to focus the ice along a narrow path thereby enabling it to fall into reasonably small mouth containers. Unfortunately, both of these solutions increase the jam potential within the spout. Every element inserted in or near the flow path represents an obstacle to moving ice. Ice which encounters an obstacle in the spout either finds another path or is captured by the obstacle. Once a particle of ice is captured or even delayed while moving through the spout, it becomes an obstacle that could capture other ice particles. Thus, solutions to the two spillage problems serve to increase the severity of the jamming problem.

The present invention is directed to a solution of all three problems.

SUMMARY OF THE INVENTION

The ice dispenser of the present invention includes a housing containing ice particles to be dispensed through a spout. An anti-jamming member is provided in the spout. A means is connected to said member for moving an end portion of the member within the spout. A means is provided for stopping dispensing of ice in response to interference with such movement of said member.

In a preferred embodiment of the present invention, the anti-jamming member has the preferred shape of being in the form of a rod which is generally vertically disposed. In the event that there is a jam-up of ice in the spout, it will interfere with the desired movement of the lower end of the rod whereby the upper end of the rod will trip a switch which deactivates the dispensing motor.

It is an object of the present invention to provide an anti-jamming means for an ice dispenser which is simple, inexpensive and reliable.

It is another object of the present invention to provide an ice dispenser which automatically is deactivated when a jam occurs in the dispensing spout.

Other objects and advantages will appear hereinafter.

For the purpose of illustrating the invention, there is shown in the drawings a form which is presently preferred; it being understood, however, that this invention is not limited to the precise arrangements and instrumentalities shown.

FIG. 3 is a sectional view taken along the line 3—3 in FIG. 2.

FIG. 4 is a sectional view taken along the line 4—4 in FIG. 3 but showing components in the position they assume during dispensing of ice.

FIG. 6 is a diagrammatic electrical wiring diagram.

Figure 1:
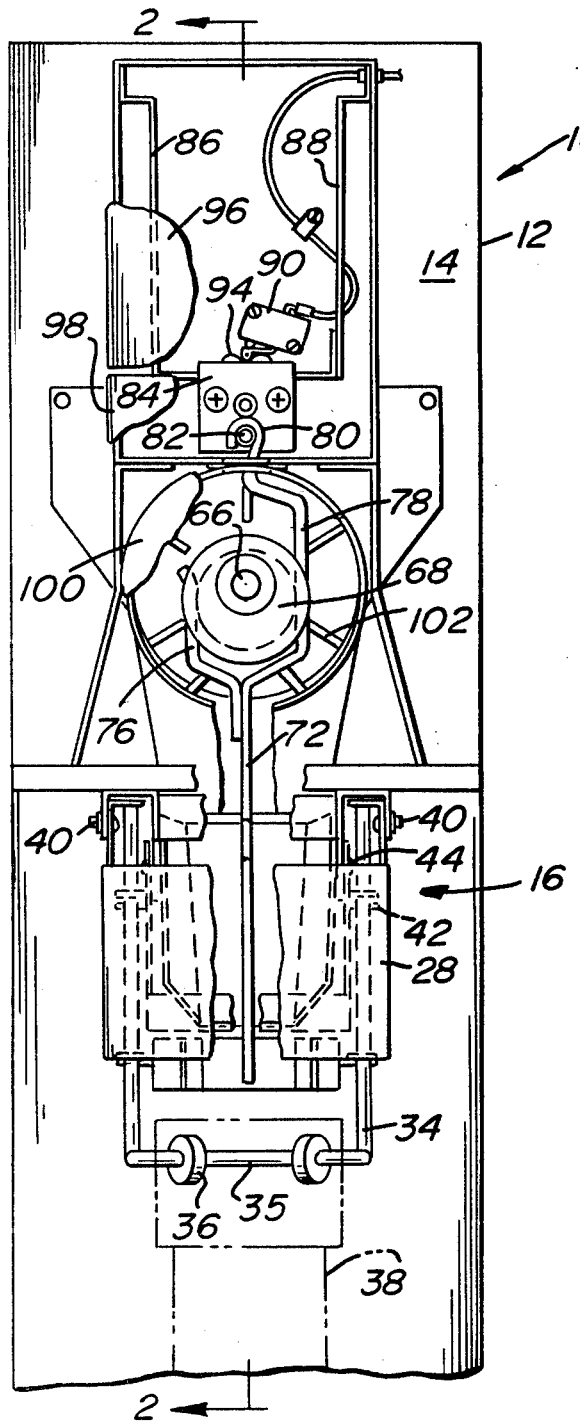
FIG. 1 is a partial front view of the ice dispenser in accordance with the present invention.

Referring to the drawings in detail, wherein like numerals indicate like elements, there is shown an ice dispenser in accordance with the present invention designated generally as 10. The dispenser 10 includes a housing 12 having a front wall 14. On the front wall 14, there is provided a dispensing spout designated generally as 16.

The dispensing spout 16 incorporates a number of interrelated elements including front guard 18, upper chute 20, middle chute 22, and lower chute 24 all of which are stationary. The chutes 22, 24 are U-shaped in section, open at the front, and spaced from one another by a gap. An ice catch 26 is movably supported in said gap between chutes 22, 24.

The lower chute 24 is fixedly secured to the front end of a drip pan 27 which extends rearwardly and downwardly therefrom. See FIG. 2. A front deflector 28 is provided. Deflector 28 is generally U-shaped in section with its open end extending rearwardly. Deflector 28 is opposite the chutes 22, 24 and cooperate therewith to confine the flow of ice. Deflector 28 is biased to the position shown in FIG. 2 by spring 32. Spring 32 is anchored to a stationary bracket 30.

Figure 2:
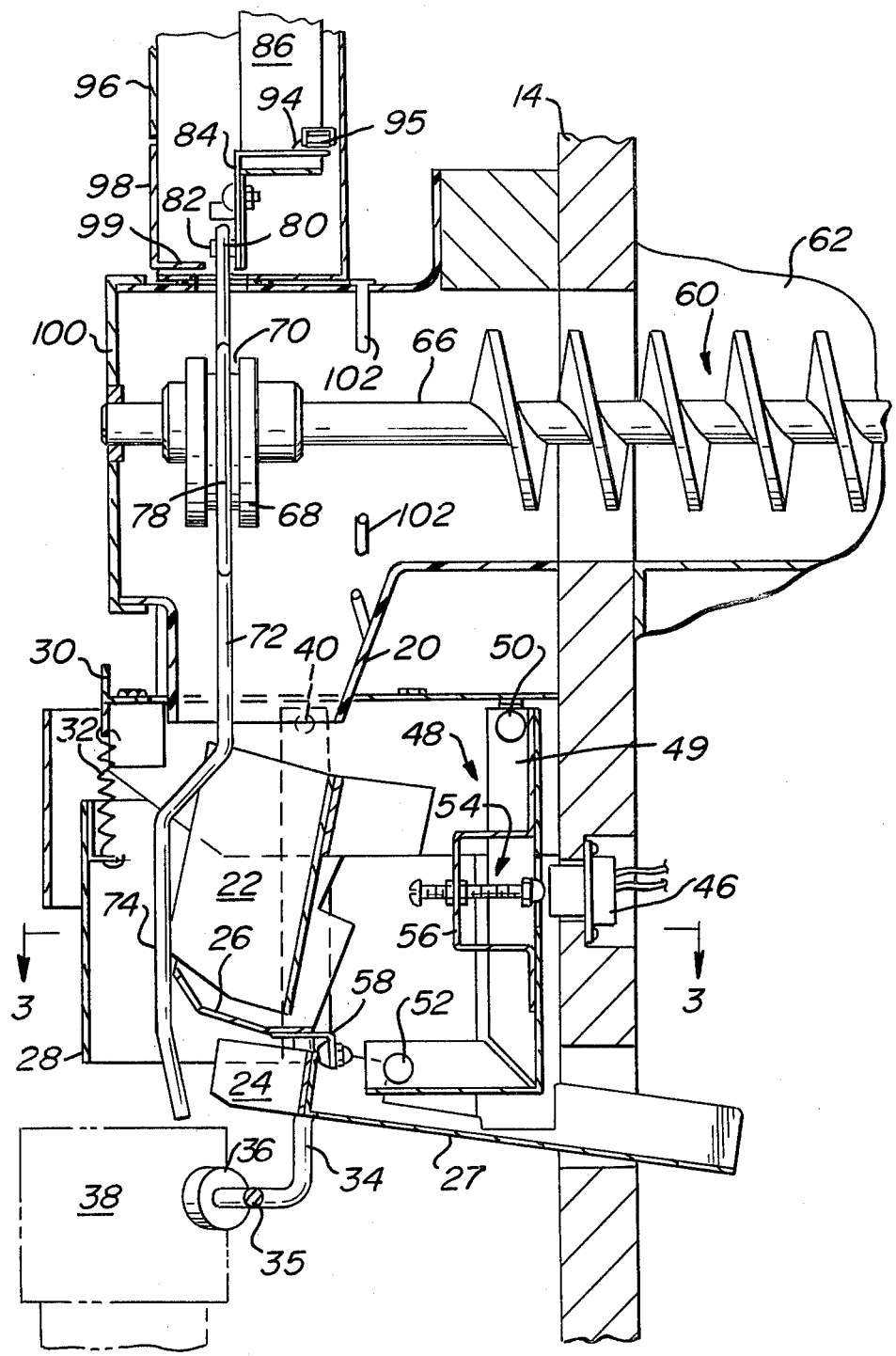
FIG. 2 is a sectional view taken along the line 2—2 in FIG. 1 on an enlarged scale.

As shown in FIG. 1, the dispenser spout includes a U-shaped actuator rod 34. Rod 34 has rubber tires 36 on the bight portion 35 thereof. As shown in FIG. 3, the bight portion 35 of rod 34 has two angled portions so that the tires 36 converge toward one another for contact with the outer periphery of a container to be filled with ice and designated generally as 38. The inoperative position of rod 34 is shown in FIG. 2. The operative position of rod 34 is shown in FIG. 4.

Referring to FIGS. 1 and 2, it will be noted that the front deflector 38 has upwardly extending legs pivotably connected to the frame for pivotal movement about the horizontally disposed pins 40. Front deflector 28 has inwardly extending flanges 41 containing holes through which the upstanding legs of actuator rod 34 extend. Hence, movement of actuator rod 34 from the position shown in FIG. 2 to the position shown in FIG. 4 by a container 38 pivots the front deflector 28 about pins 40 from the position shown in FIG. 2 to the position shown in FIG. 4.

The ice catch 26 has upstanding legs pivotably supported by a stationary bracket for movement about the axis of pins 44. See FIGS. 1 and 4. Each upstanding leg of the ice catch 26 has outwardly directed ears 42. Each upstanding leg of the actuator rod 34 extends between a pair of ears 42 on the ice catch 26. Hence, when the actuator rod 34 is moved from the position shown in FIG. 2 to the position shown in FIG. 4, it simultaneously pivots the ice catch 26.

A switch 46 is supported in any convenient location such as on the front wall 14 of the housing 12. See FIGS. 2-4. Switch 46 is provided with an actuator designated generally as 48. The actuator 48 is generally L-shaped in vertical section as shown in FIG. 2 with forwardly projecting flanges 49 along its side edges.

The upper end of each flange 49 is pivotably connected to the housing by pin 50. As shown more clearly in FIG. 3, the front end of the actuator 48 includes horizontally disposed projections 52. A contact member 54 is adjustably supported by a bracket 56 in the middle of the actuator 48 so that member 54 may actuate switch 46 in the operative position of the elements as shown in FIG. 4. Projections 52 are in the path of the vertically disposed legs of actuator rod 34 whereby actuator 48 is moved in response to contact with actuator rod 34. The ice catch 26 at its rear end has a resilient limit stop 58 for limiting noise as well as the extent of movement of the ice catch 26 as will be apparent from a comparison of FIGS. 2 and 4.

Referring to FIG. 2, the housing 12 includes an insulated bin 62 containing ice to be dispensed. Ice is manufactured within the housing 12 in a conventional manner and deposited in the bin 62 in a conventional manner. Ice is dispensed from the bin 62 through the spout 16 by an auger 60. Auger 60 is horizontally disposed adjacent the bottom of the bin 62 and is driven at its righthand end in FIG. 2 by a motor 64 which is shown in FIG. 6. The shaft 66 of auger 60 is lengthened so as to extend across the chute 20. Within or adjacent the chute 20, the shaft 66 is provided with a cam 68 having a peripheral groove 70.

Figure 5:
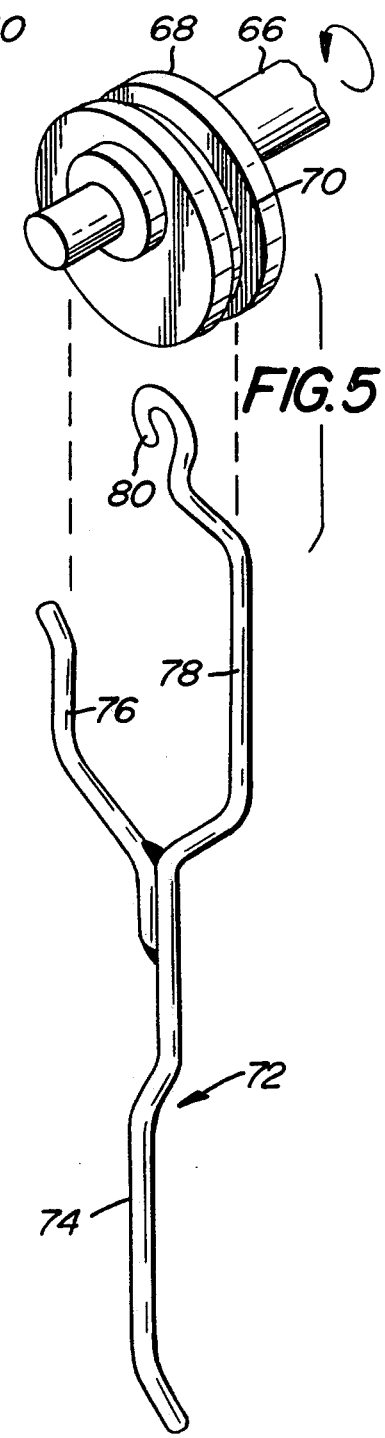
FIG. 5 is a perspective view of the anti-jam rod and its cam actuator.

An anti-jamming member such as rod 72 is operatively associated with the cam 68. See FIGS. 1 and 5. Rod 72 is generally Y-shaped as shown in FIG. 5 with an offset lowered portion 74, see FIG. 2, and a pair of legs 76, 78. The legs 76, 78 are received within the groove 70. Cam 68 is eccentric with respect to the longitudinal axis of shaft 66. One of the legs such as leg 78 is extended to form a hook 80 which is centrally disposed so as to be directed above the center line of rod 74. See FIG. 1.

The hook 80 is pivotably supported by a pin 82. Due to the eccentricity of the cam 68, for every rotation of the auger 60, rod 72 will be oscillated about the pin 82 providing that there is no jam in the dispensing spout 16. It will be noted that the rod 72 extends vertically through the entire height of the spout 16. As shown more clearly in FIGS. 2 and 4, the offset lower end portion 74 of the rod 72 does not interfere with the ice catch 26 or the front deflector 28 in their operative positions. The offset nature of the lower end portion 74 of the rod 72 is not essential but preferred since it locates the rod outside of the main flow path of the ice and eliminates interfering between the ice catch 26 as well as front deflector 28.

The pin 82 is mounted on a support 84. See FIGS. 1 and 2. Support 84 is connected to the upper end of the housing by a pair of legs 86, 88 made of flexible resilient material such as spring steel. A switch 90 has its contact element 95 between a pair of projections 94 on the upper surface of support 84. If a force is imparted to the pin 82 from left to right or right to left in FIG. 1, the support 84 moves horizontally whereby one of the projections 94 trips the contact element 95 of the switch 90.

Referring to FIG. 1, the various components are concealed from view by removable cover plates. Thus, the chamber containing switch 90 is provided with at least one and preferably two discrete cover plates 96, 98. Likewise, the chute 20 is provided with a removable cover 100 for rotatably supporting the lefthand end of the shaft 66. Cover plate 98 has a flange 99 at its lower end which prevents hook 80 from sliding off pin 82. See FIG. 2. To prevent ice from flowing out of the bin when the auger is not turning, the walls of spout 20 may have inwardly directed flexible fingers 102 which are preferably made from solid rubber.

Referring to FIG. 6, it will be noted that the switches 46 and 90 are in series with the motor 64 for driving the auger 60. A capacitor 104 is in series with the diode 106 in parallel with motor 64. Another capacitor 108 is in parallel with the motor 64. Switch 46 is normally open and engages contact 110. Switch 90 is normally closed and when open engages contact 112.

The ice dispenser of the present invention operates in the following manner. Let it be assumed that chute 22 contains particles of ice which may be in the form of cubes, chips, and the like. The particles of ice are supported from below by the ice catch 26. Any melted ice in the form of water is directed by the inner surface of the ice catch 26 to the drain pan 27. All of such ice particles are supported from below by the ice catch 26.

When it is desired to dispense ice particles into a container, the container 38 is positioned as shown in FIG. 2 and pressed inwardly so as to pivot the actuator rod 34 from the position shown in FIG. 2 to the position shown in FIG. 4. As the actuator rod 34 pivots, it moves the ice catch 26 and front deflector 28 thereby expanding spring 32. Also, the actuator rod 34 pivots the switch actuator 48 about the pins 50 due to contact with the projections 52. Contact member 54 closes switch 46. Motor 64 is immediately energized. The ice above ice catch 26 has now fallen into the container 38.

The motor 64 drives the auger 60 to continuously feed more ice so long as actuator rod 34 remains in the position shown in FIG. 4. As shaft 66 rotates, the cam 68 oscillates the lower end of rod 72 about pin 82. The front deflector 28 and the chutes 22, 24 help to confine the ice into a narrow flow path. When the container 38 has been filled to the desired level, it is retracted.

Retraction of the container 38 enables spring 32 to return elements 28, 34, 26, and 54 to the inoperative position shown in FIG. 2. Switch 46 is now open. Ice catch 26 supports and captures the "in flight" ice thereabove.

When switch 46 opens, it bridges contact 110 whereby capacitor 104 acts as a DC source across motor 64 and brakes motor 64. When switches 46, 90 are closed, capacitor 104 is charged by the diode 106. Capacitor 108 acts as an arc suppressor.

In the event that there is a jam-up of ice particles within the dispensing spout 16, such ice jam will interfere with the oscillation of the lower end of rod 72 whereby said lower end will not be permitted to oscillate. Interference with the oscillation of the lower end of rod 72, while the rod 72 is continuously oscillated by cam 68 produces the following result. Instead of pivoting about pin 80, the rod 72 will now be pivoted about its jammed lower end portion whereby the hook 80 at the upper end of the rod 72 will move the support 84 horizontally in FIG. 1. Movement of support 84 can be quite small such as 2 or 3 millimeters. Such movement opens switch 90 and causes it to engage contact 112.

When switch 90 bridges contact 112, capacitor 104 acts as a DC source and brakes motor 64. Thus, motor 64 is provided with a brake to immediately stop the dispensing action whenever switch 46 or 90 is opened. Without such a brake, the motor 64 would coast to a stop with consequent continued feeding of ice particles into the dispensing spout 16 long after the container 38 has been retracted. It will be noted that switch 90 will be opened in the event that support 84 moves to the right or to the left in FIG. 1 due to the lower end of rod 72 being jammed with ice.

The apparatus of the present invention incorporates the following features described above. The ice particles are focused into a fairly small pattern (by deflector 28 which cooperates with chutes 22, 24) thereby providing for splash-free filling of small mouth containers. The ice chute 26 catches and retains in-flight ice for subsequent dispensing rather than permitting such ice to be wasted. Hence, the effective capacity of the apparatus is increased. When incipient jams are detected, there is an immediate de-energization of the dispensing action. In the event of a jam, the flow path is immediately increased due to movement of the front deflector 28 from the position shown in FIG. 4 to the position shown in FIG. 1 as container 38 is withdrawn thereby increasing the area through which the jammed ice may descend. Meltage from both the bin and the caught ice is received by the ice catch 26 and directed to the drain pan 27. As will be apparent from the above description, the anti-jamming rod 72 is simple and reliable whereby the objects of the present invention are attained in a manner which is inexpensive. In this regard, the anti-jamming rod does not require a separate actuator as such but rather utilizes the rotary force of the auger 60.

The present invention may be embodied in other specific forms without departing from the spirit or essential attributes thereof and, accordingly, reference should be made to the appended claims, rather than to the foregoing specification, as indicating the scope of the invention.

I claim:

1. An ice dispenser comprising a housing containing ice particles to be dispensed through a spout, means for dispensing ice through said spout, an anti-jamming rod in said spout, means connected to the rod for moving an end portion of the rod in said spout, and means for stopping dispensing of ice by said first mentioned means in response to detection of interference with said movement of said rod.

2. Apparatus in accordance with claim 1 wherein dispensing of ice through said spout and movement of said rod is attained by a single motor.

3. Apparatus in accordance with claim 2 wherein said motor rotates a cam engaging said rod intermediate the ends of said rod, and means pivotably supporting the upper end of said rod.

4. Apparatus in accordance with claim 1 wherein dispensing action is initiated by closing a switch responsive to movement of an actuator contacted by a container into which ice is to be dispensed, said actuator being operatively connected to an ice catch and a front deflector which are movable therewith, such movement of the actuator moving the ice catch to a position where it no longer interferes with the flow of ice through the spout while simultaneously moving the front deflector to a position wherein it constricts the flow path for ice particles.

5. Apparatus comprising a housing containing ice particles to be dispensed through a spout, a motor, a device driven by said motor for dispensing ice particles through said spout, said spout including a first chute and a second chute, said second chute being above and spaced from said first chute, an ice catch movable in the space between said chutes for collecting in-flight ice, a front deflector juxtaposed to said chutes and cooperating with said chutes to confine flow of ice particles, the lower end of said deflector being movable inwardly towards said lower chute, actuator means for starting said motor when dispensing is desired, said actuator means being coupled to said ice catch and front deflector to cause movement of the same in a common direction whereby the ice catch is incapable of catching in-flight ice and the lower end of the ice flow path has been constricted by such movement of the deflector during dispensing of ice and is moved to enlarge the ice flow path when there is no dispensing so that any jammed ice in the spout can be unjammed by the enlarged flow path, and said spout including means for detecting an ice jam in said spout and for stopping said motor when a jam occurs.

6. An ice dispenser in accordance with claim 5 wherein said last-mentioned means includes a rod-like member which extends downwardly between said chutes and said front deflector.

7. An ice dispenser in accordance with claim 6 wherein said device is an auger, said rod-like member being operatively coupled to said auger that rotation of the auger oscillates said rod-like member about the upper end of said rod-like member when there is no ice jam in said spout and oscillates said rod-like member about the lower end of said rod-like member when there is an ice jam.

8. Apparatus in accordance with claim 7 wherein said rod-like member has an offset lower end portion and a bifurcated intermediate portion, a cam driven by said auger and positioned for cooperation with said bifurcated portion.

9. An ice dispenser in accordance with claim 7 including circuitry for stopping said motor, said circuitry including a switch responsive to movement of the upper end of said rod-like member.

10. An ice dispenser in accordance with claim 5 wherein said last mentioned means includes a member coupled to and moved by said motor, said member being disposed upright in said spout between said deflector and said ice catch.

11. An ice dispenser comprising a housing containing ice particles to be dispensed through a spout, ice dispensing means including a device driven by a motor for causing ice particles to move through said spout, means associated with said spout for detecting a jam of ice in said spout, circuitry associated with said motor including an on-off switch in series with a second switch, said second switch being responsive to detection of ice jammed in said spout, said second switch being a normally closed switch, said second switch being coupled to said jam detecting means so that said second switch is opened when a jam occurs in said spout, said circuitry including means for braking said motor when either of said switches is opened.

* * * * *